United States Patent
Liu

(10) Patent No.: US 8,288,967 B2
(45) Date of Patent: Oct. 16, 2012

(54) LED CONTROL CIRCUIT AND METHOD

(75) Inventor: Jing-Meng Liu, Hsinchu County (TW)

(73) Assignee: Richtek Technology Corp., Hsinchu (TW)

( * ) Notice: Subject to any disclaimer, the term of this patent is extended or adjusted under 35 U.S.C. 154(b) by 453 days.

(21) Appl. No.: 12/721,829

(22) Filed: Mar. 11, 2010

(65) Prior Publication Data

US 2010/0164394 A1 Jul. 1, 2010

Related U.S. Application Data

(63) Continuation-in-part of application No. 12/382,588, filed on Mar. 19, 2009.

(30) Foreign Application Priority Data

Mar. 21, 2008 (TW) .............................. 97110136 A

(51) Int. Cl.
*H05B 37/02* (2006.01)

(52) U.S. Cl. ........ 315/360; 315/291; 315/307; 315/308; 372/28; 372/30; 372/32; 372/38.02; 327/108; 327/144

(58) Field of Classification Search .................. 315/312, 315/360, 291, 219, 307, 287, 224, 308, DIG. 4; 323/282, 283, 285, 288, 290; 327/108–110, 327/117, 132, 144; 363/21.17, 21.18, 89, 127; 372/28, 29.02, 30, 32, 38.07, 38.02
See application file for complete search history.

(56) References Cited

U.S. PATENT DOCUMENTS

| | | | |
|---|---|---|---|
| 6,577,072 B2 * | 6/2003 | Saito et al. ................ | 315/185 R |
| 6,927,607 B2 * | 8/2005 | Choi et al. .................... | 327/108 |
| 6,979,987 B2 * | 12/2005 | Kernahan et al. ............. | 323/283 |
| 6,987,787 B1 * | 1/2006 | Mick .......................... | 372/29.21 |
| 7,145,295 B1 * | 12/2006 | Lee et al. ...................... | 315/291 |
| 7,196,481 B2 * | 3/2007 | Bushell et al. ................ | 315/291 |
| 7,378,805 B2 * | 5/2008 | Oh et al. ....................... | 315/291 |
| 7,417,616 B2 * | 8/2008 | Min et al. ...................... | 345/102 |
| 7,503,675 B2 * | 3/2009 | Demarest et al. ............. | 362/253 |
| 7,800,315 B2 * | 9/2010 | Shteynberg et al. .......... | 315/291 |
| 2009/0236997 A1 * | 9/2009 | Liu ........................... | 315/209 R |

* cited by examiner

*Primary Examiner* — Haiss Philogene

(74) *Attorney, Agent, or Firm* — Rosenberg, Klein & Lee

(57) ABSTRACT

A LED control circuit and method determine the frequency and duty of a LED driving signal according to a swing control signal and a dimming control signal, respectively. Responsive to the swing control signal, a pulse edge generator generates a clock whose frequency is determined by the swing control signal. Responsive to the clock and the dimming control signal, a duty ratio controller generates the LED driving signal whose frequency is determined by the clock frequency and whose duty is determined by the dimming control signal.

48 Claims, 7 Drawing Sheets

US 8,288,967 B2

LED CONTROL CIRCUIT AND METHOD

CROSS REFERENCE TO RELATED APPLICATION

This application is a continuation-in-part of U.S. patent application Ser. No. 12/382,588, filed Mar. 19, 2009 and entitled "LED Control Circuit and Method, and Insect Resistive LED Lamp," the disclosure of which is hereby incorporated by reference as if set forth fully herein.

FIELD OF THE INVENTION

The present invention is related generally to a LED control circuit and method and, more particularly, to an insect resistive LED lamp.

BACKGROUND OF THE INVENTION

Insects such as flies and mosquitoes pose great hazards to the living quality of human beings, but insecticides, which are the most direct solution to such hazards, are harmful to the human body and environment. Hence, a wide variety of insect resistive products based on the susceptibility of insects to scents, humidity and light are always developed, including, for example, fly catching paper and mosquito killer lamps. Light has enormous ecological effects on insects. Taking fireflies for example, the flashing frequency of their abdominal bioluminescence is depended upon as means for attracting mates and communication in the dark. Many insects can sense much higher flashing frequency than human eyes, and some kind of swing pattern in flashing frequency can make insects nervous and uncomfortable.

Light emitting diode (LED) is a device that emits light when electrically biased in the forward direction of a semiconductor p-n junction, and is characterized by heterogeneous dual junction and quantum wells. The first commercial red GaAsP LED was offered by General Electric Company in 1962. The luminous flux of the first red LED was 0.11 m/W, or 1/150 times of an ordinary lamp, with an emissive efficiency increasing by one order of magnitude per decade approximately. The recent advent of high power white LEDs in the wake of implementation of blue LEDs and green LEDs heralds gradual transition from decoration to illumination in terms of the purpose of LEDs, paving the way for ultimate replacement of conventional light bulbs by LEDs. In addition to being environmentally friendly and power saving, LED can be turned on and off in high frequency up to over MHz range. Furthermore, there have been plenty of methods for pulse width modulation (PWM) dimming in LED lighting.

SUMMARY OF THE INVENTION

An objective of the present invention is to propose a LED control circuit and method for generating a LED driving signal to drive an insect resistive LED lamp.

According to the present invention, a LED control circuit includes a pulse edge generator responsive to a swing control signal to generate a clock, and a duty ratio controller responsive to the clock and a dimming control signal to generate a LED driving signal whose frequency is determined by the frequency of the clock and whose duty is determined by the dimming control signal.

According to the present invention, a method for generating a LED driving signal includes generating a clock according to a swing control signal, and generating the LED driving signal according to the clock and a dimming control signal such that the LED driving signal has a frequency determined by the frequency of the clock and a duty determined by the dimming control signal.

BRIEF DESCRIPTION OF THE DRAWINGS

These and other objects, features and advantages of the present invention will become apparent to those skilled in the art upon consideration of the following description of the preferred embodiments of the present invention taken in conjunction with the accompanying drawings, in which.

DETAIL DESCRIPTION OF THE INVENTION

Figure 1:
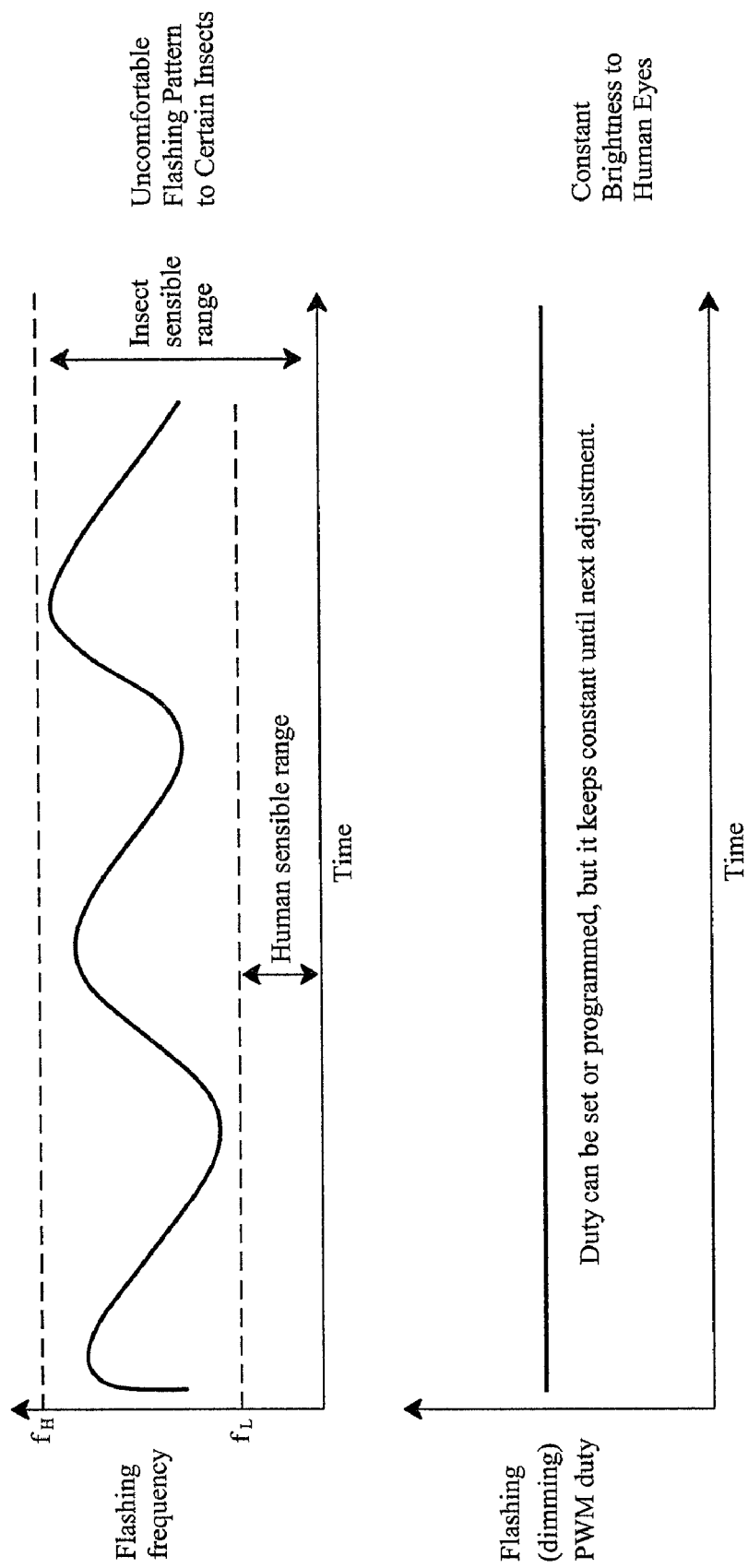
FIG. 1 is a schematic drawing showing the flashing frequencies sensible to human eyes and insects, as well as a flashing mode to be implemented in embodiments of the present invention.

Referring to FIG. 1, given a fixed duty, human eyes can only sense the flashing frequency below $f_L$, and take the average brightness of high frequency flashing as a steady light source. The upper limit $f_L$ of human sensible range in flashing frequencies is generally around 60 Hz but varies from person to person. Above $f_L$, the brightness of the flashing light source is directly proportional to the duty but does not correlate with the flashing frequency. On the other hand, insects discern flashing frequencies up to $f_H$, which is much higher than $f_L$, and this is the reason why the LED control circuit and method according to the present invention can be used for insect resistive LED lamps. Keeping the flashing frequency range of swings out of the sensible range of human eyes, and keeping the dimming pulse width modulation (PWM) duty the same during the frequency swinging, so that the average brightness is almost the same, and thus this lighting condition is totally equivalent to that of a constant brightness light source when seeing by human eyes, the LED control circuit and method according to the present invention can achieve the purpose of expelling, confusing or trapping insects, without affecting human beings. Preferably, the dimming PWM duty can be set or programmed, but it keeps constant until next adjustment.

Figure 2:
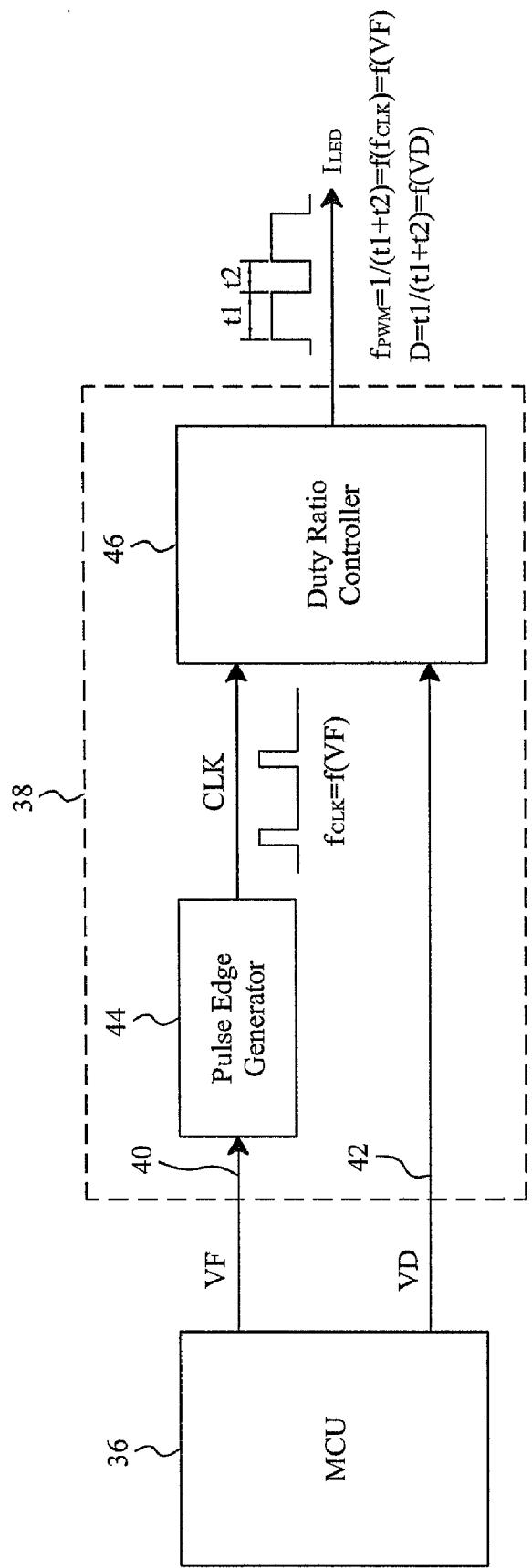
FIG. 2 is a circuit diagram of an embodiment according to the present invention.

FIG. 2 is a circuit diagram of an embodiment according to the present invention, in which a LED control circuit 38 has two control signal input terminals 40 and 42 to receive a swing control signal VF and a dimming control signal VD, from a micro controller unit (MCU) 36 for example, and according thereto, generates a LED driving signal $I_{LED}$ whose frequency $f_{PWM}$ is controlled by the swing control signal VF and whose duty D is controlled by the dimming control signal VD. In the LED control circuit 38, a pulse edge generator 44 is connected to the control signal input terminal 40 to receive the swing control signal VF and thereby generate a clock CLK whose frequency $f_{CLK}$ is determined by the swing control signal VF, and a duty ratio controller 46 is connected to the control signal input terminal 42 and the pulse edge generator 44 to generate the LED driving signal $I_{LED}$ according to the clock CLK and dimming control signal VD. The frequency $f_{PWM}$ of the LED driving signal $I_{LED}$ is determined by the frequency $f_{CLK}$ of the clock CLK and thus determined by the swing control signal VF, and the duty D of the LED driving signal $I_{LED}$ is determined by the dimming control signal VD. The on-time and off-time of the LED driving signal $I_{LED}$ are denoted by t1 and t2 respectively, and thus the frequency $f_{PWM}$ and duty D of the LED driving signal $I_{LED}$ are given as $$f_{PWM}=1/(t1+t2)=f(VF),$$

and $$D=t1/(t1+t2)=f(VD).$$

Therefore, the swing control signal VF individually controls the frequency $f_{PWM}$ of the LED driving signal $I_{LED}$, and the dimming control signal VD individually controls the duty D of the LED driving signal $I_{LED}$.

The LED driving signal $I_{LED}$ is for driving a LED lamp. Since the frequency $f_{PWM}$ and duty D of the LED driving signal $I_{LED}$ are individually controlled by the swing control signal VF and dimming control signal VD respectively, the swing control signal VF and dimming control signal VD will individually determine the flashing frequency and brightness of the driven LED lamp respectively. This control scheme is convenient for users to adjust the brightness of a LED lamp, without changing the flashing feature of the LED lamp, or to adjust the flashing frequency of the LED lamp, without changing the brightness of the LED lamp. For example, by setting VD constant, and varying VF with time in a specific mode, the LED lamp will produce flashing light characterized as shown in FIG. 1. The duty D for the LED driving current $I_{LED}$ can be set or programmed by the dimming control signal VD, but keeps constant until it is adjusted. In other words, the brightness of the LED lamp will be constant at a value unless VD changes. By using the swing control signal VF, the LED lamp emits flashing light in a certain swing pattern, at the frequency varying between $f_L$ and $f_H$.

Figure 3:
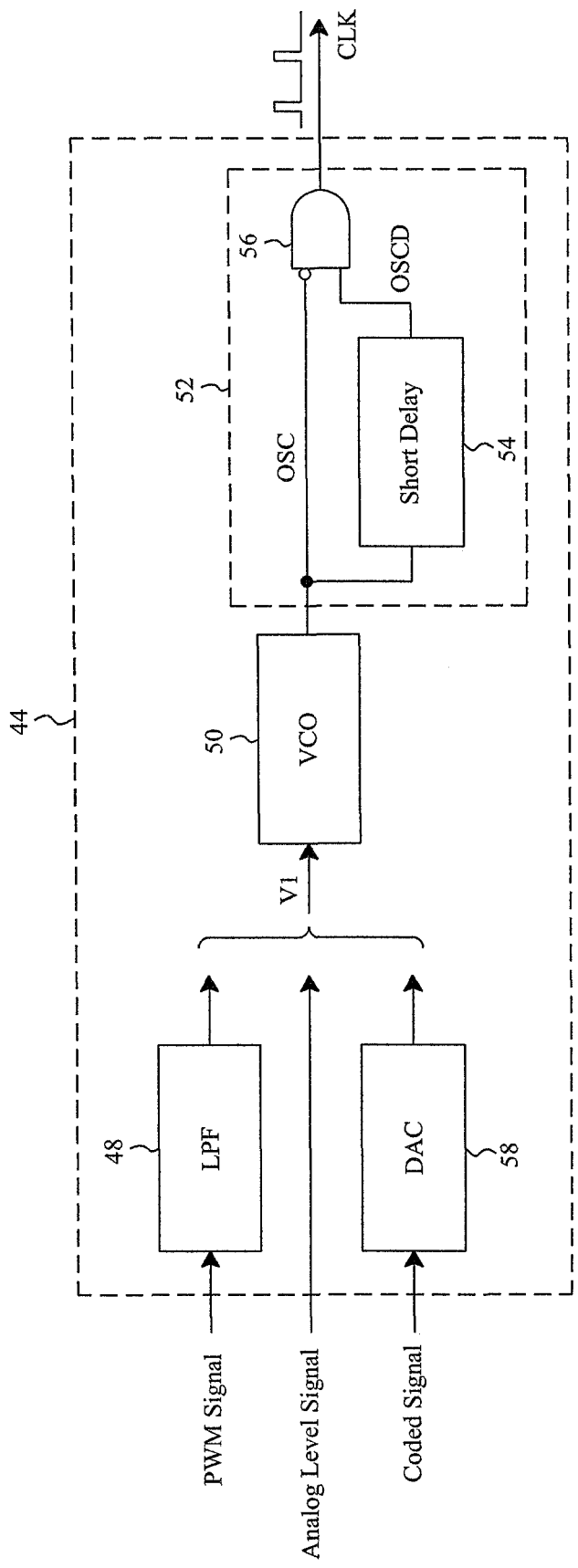
FIG. 3 provides three embodiments for the pulse edge generator shown in FIG. 2.

As shown in FIG. 3, the swing control signal VF may include a PWM signal, an analog level signal, or a coded signal. If the swing control signal VF includes a PWM signal, the pulse edge generator 44 includes a low-pass filter (LPF) 48 to filter the PWM signal to generate an analog level signal V1, a voltage controlled oscillator (VCO) 50 to generate an oscillating signal OSC according to the analog level signal V1, and an edge detector 52 to detect the pulse edges of the oscillating signal OSC to generate the clock CLK. If the swing control signal VF includes an analog level signal, it may be directly sent into the VCO 50, for the VCO 50 and edge detector 52 to generate the clock CLK. If the swing control signal VF includes a coded signal, the pulse edge generator 44 includes a digital-to-analog converter (DAC) 58 to convert the coded signal into an analog level signal V1, for the VCO 50 and edge detector 52 to generate the clock CLK. In the edge detector 52, a short delay unit 54 short delays the oscillating signal OSC to generate a delayed oscillating signal OSCD, and a digital logic gate 56 generates the clock CLK according to the oscillating signal OSC and its delayed version OSCD.

Figure 4:
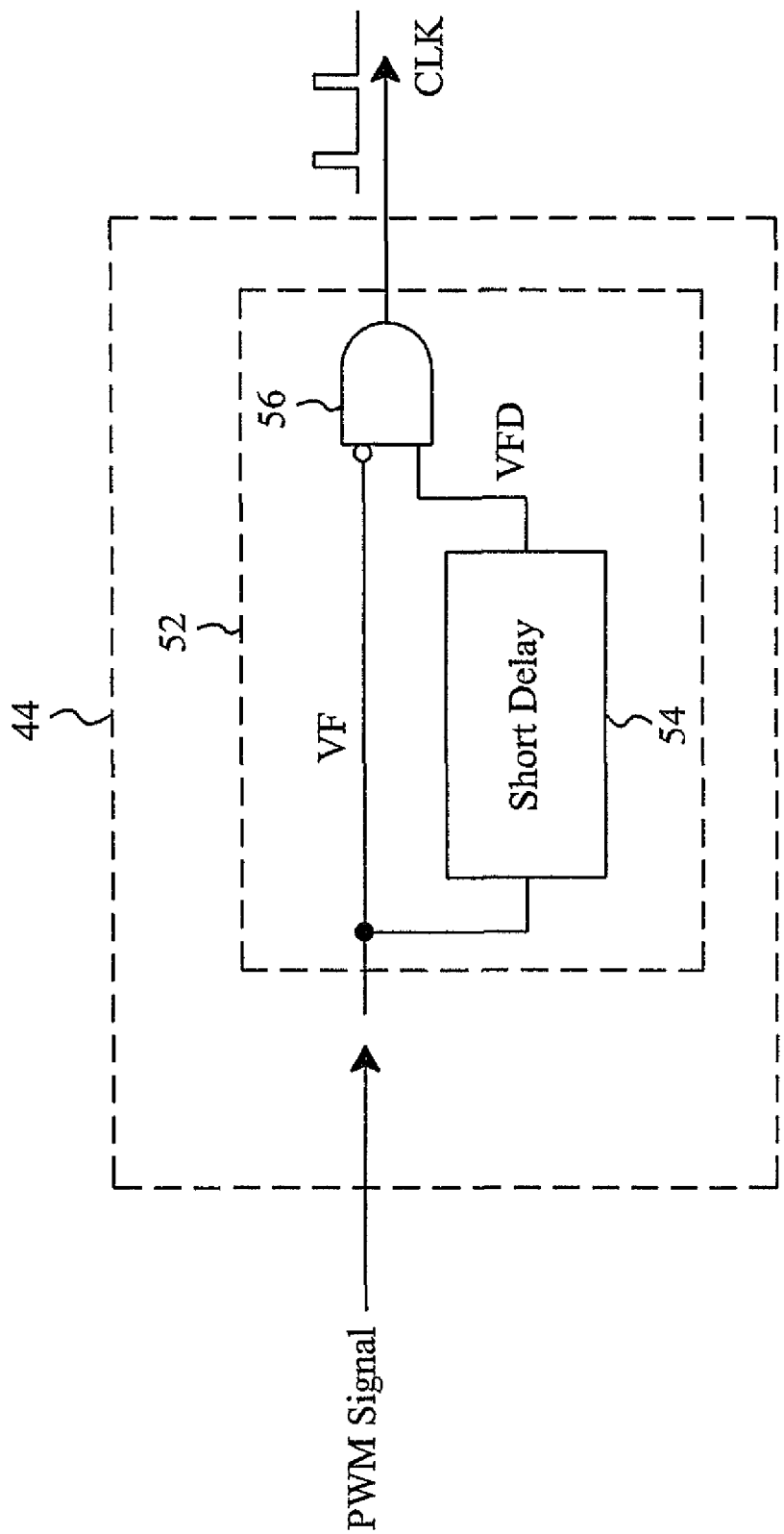
FIG. 4 is a circuit diagram of a fourth embodiment for the pulse edge generator shown in FIG. 2.

Alternatively, as shown in FIG. 4, if the swing control signal VF includes a PWM signal, the pulse edge generator 44 may include only the edge detector 52 which detects the pulse edges of the PWM signal to generate the clock CLK.

Figure 5:
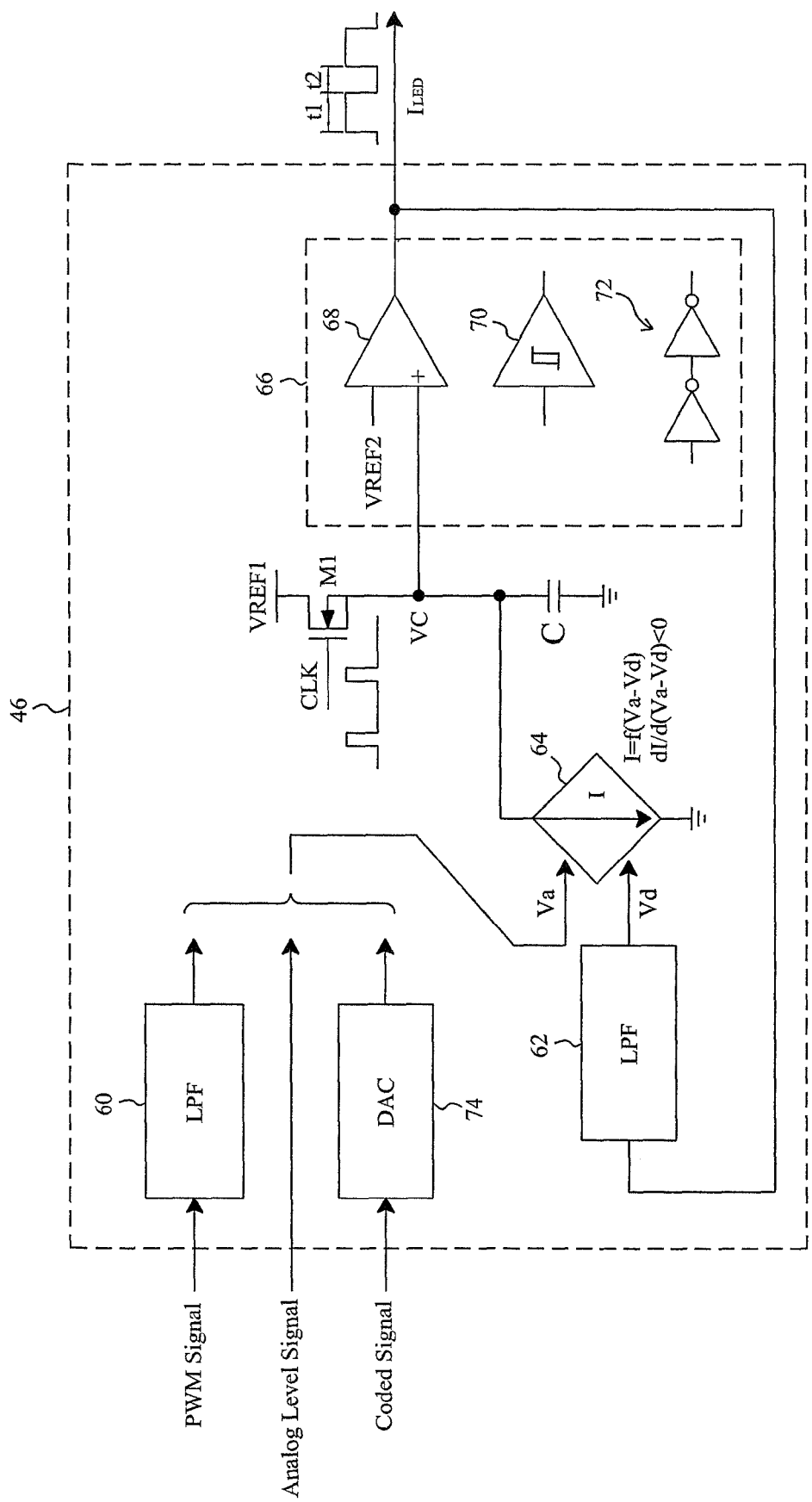
FIG. 5 provides three embodiments for the duty ratio controller shown in FIG. 2.

As shown in FIG. 5, the dimming control signal VD may include a PWM signal, an analog level signal, or a coded signal. If the dimming control signal VD includes a PWM signal, the duty ratio controller 46 includes a LPF 60 to filter the PWM signal to generate an analog level signal Va, a LPF 62 to filter the LED driving signal $I_{LED}$ to generate an analog level signal Vd, a voltage controlled current source (VCCS) 64 to provide a current I according to the difference Va-Vd, a transistor M1 having an input terminal to receive a first reference voltage VREF1, a control terminal to receive the clock CLK, and an output terminal to preset a node voltage VC, a capacitor C connected to the output terminal of the transistor M1 and the VCCS 64, and a PWM generator 66 to generate the LED driving signal $I_{LED}$ according to the voltage VC. In an embodiment, the PWM generator 66 includes a comparator 68 to compare the voltage VC with a reference voltage VREF2 to generate the LED driving signal $I_{LED}$. When the transistor M1 is turned on by the clock CLK, the voltage VC is equal to the reference voltage VREF1 and thereby triggers the on-time t1 of the LED driving signal $I_{LED}$. When the transistor M1 is turned off by the clock CLK, the capacitor C is discharged by the VCCS 64 with the discharging current I, and the voltage VC decreases from the reference voltage VREF1. Once the decreasing voltage VC crosses over the reference voltage VREF2, the LED driving signal $I_{LED}$ is turned off. The discharging current I determines the decreasing slop of the voltage VC and thereby determines the width of the on-time t1. The discharging current I is a function of the difference Va-Vd, preferably in proportion thereto, and has a negative changing rate with the difference Va-Vd. In other embodiments, the PWM generator 66 may includes a hysteresis comparator 70 (, which can have a single-ended input or the differential inputs) or an inverter string 72 to generate the LED driving signal $I_{LED}$ according to the voltage VC. If the dimming control signal VD includes an analog level signal, it is directly applied to the VCCS 64 as the signal Va. If the dimming control signal VD includes a coded signal, a DAC 74 is used to convert it into the signal Va.

Figure 6:
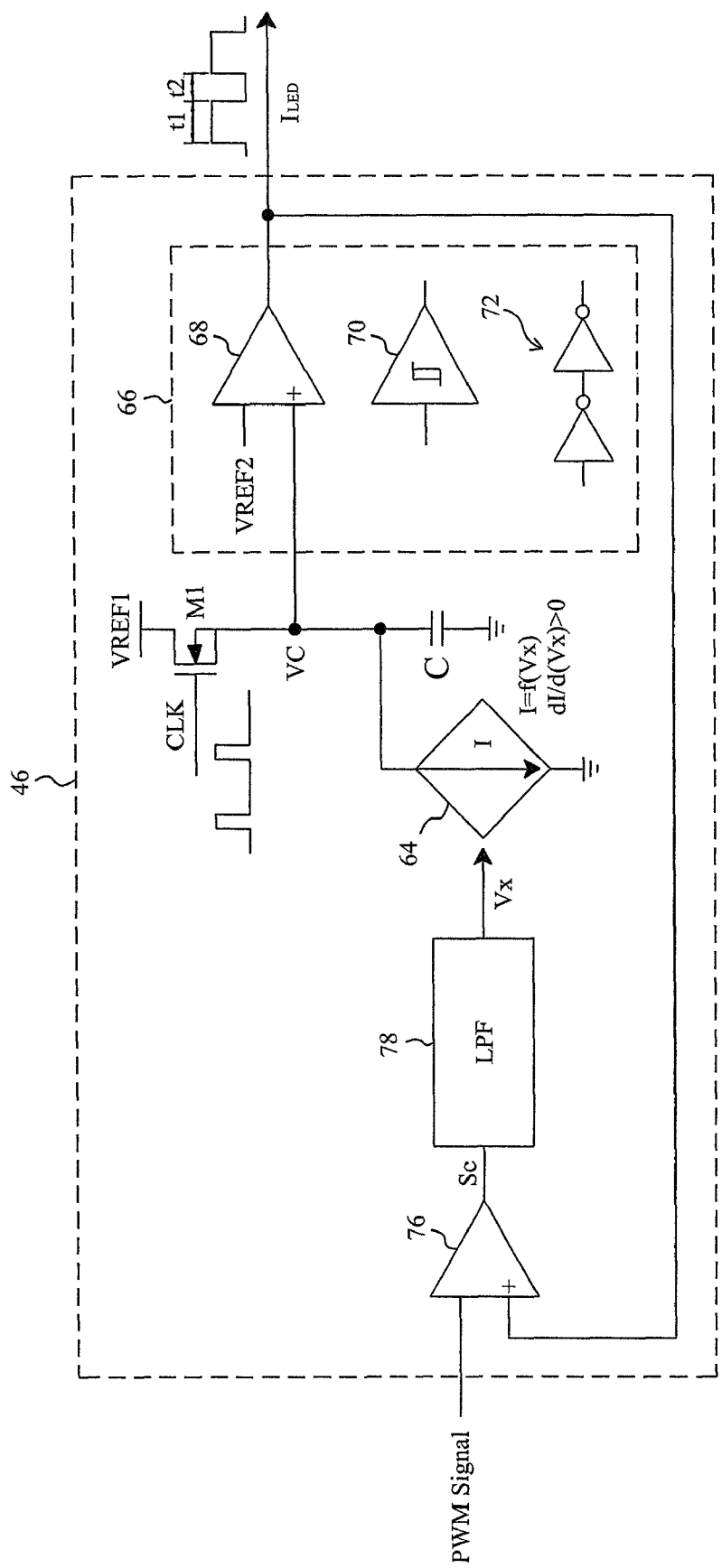
FIG. 6 is a circuit diagram of a fourth embodiment for the duty ratio controller shown in FIG. 2.

Alternatively, as shown in FIG. 6, if the dimming control signal VD includes a PWM signal, the duty ratio controller 46 includes a comparator 76 to compare the PWM signal with the LED driving signal $I_{LED}$ to generate a comparison signal Sc, and a LPF 78 to filter the comparison signal Sc to generate an analog level signal Vx which controls the current I provided by the VCCS 64. The current I has a positive changing rate with the analog level signal Vx.

Figure 7:
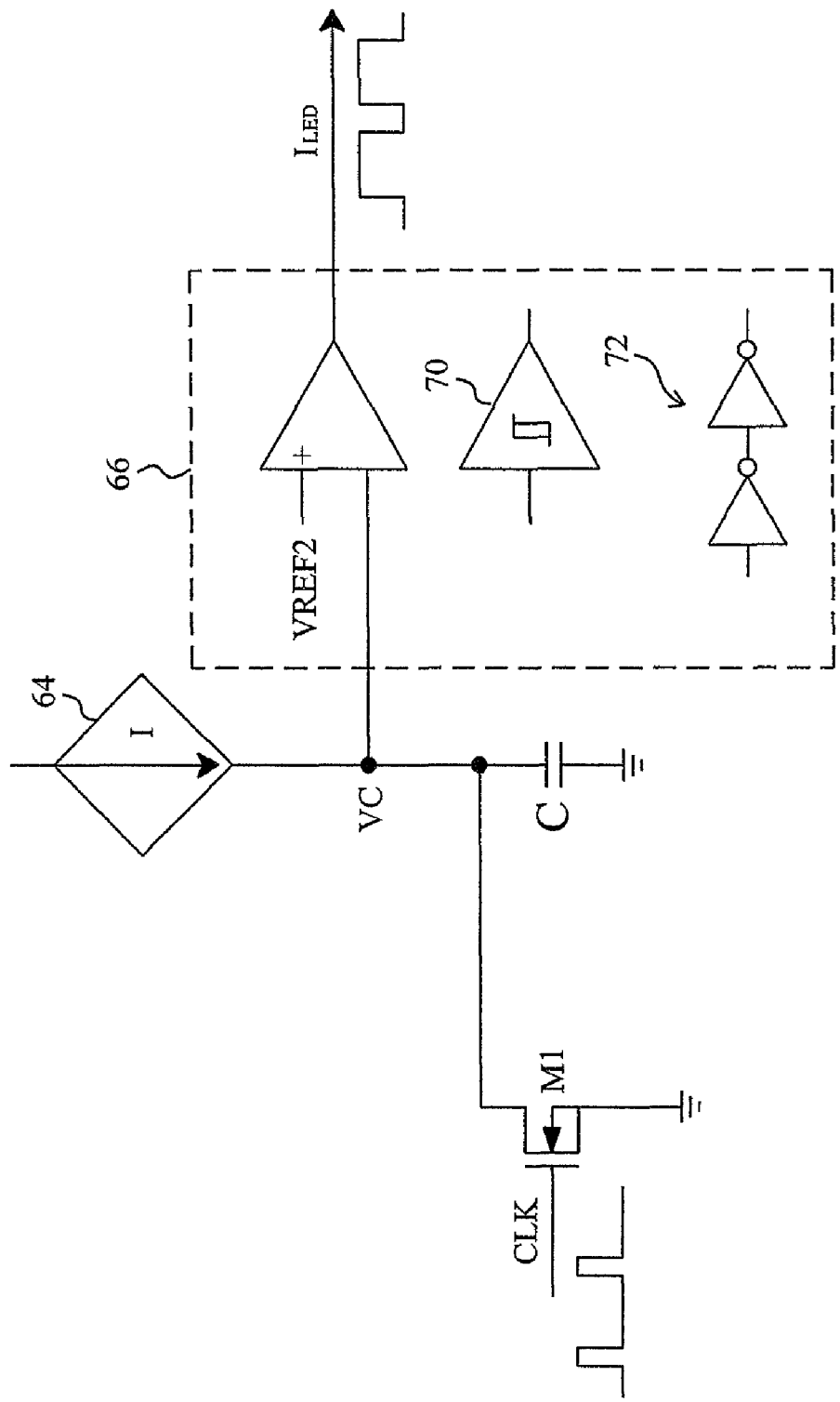
FIG. 7 is a circuit diagram of a fifth embodiment for the duty ratio controller shown in FIG. 2.

To control the voltage VC, it may use another circuit as shown in FIG. 7, in which the transistor M1 is connected between the capacitor C and a ground terminal, and the VCCS 64 provides a charging current I. When the transistor M1 is turned on by the clock CLK, the capacitor C is grounded to reset the voltage VC, and thereby the LED driving signal $I_{LED}$ is triggered. When the transistor M1 is turned off by the clock CLK, the capacitor C is charged by the VCCS 64 and the voltage VC increases. Once the increasing voltage VC crosses over the reference voltage VREF2, the LED driving signal $I_{LED}$ is turned off. The charging current I will determine the duty D of the LED driving signal $I_{LED}$.

There are still many equivalent circuit substitutions for implementing the embodiments of this invention. For example, the pulse edge detector can also be implemented with a high pass filter circuit, which can be merged into another circuit block, and the hysteresis comparator can also be implemented with the Smith-trigger circuit, etc. Furthermore, the embodiments and their alternatives can be constructed with discrete components, integrated circuits, combinations of discrete components and integrated circuits, or a single-chip integration circuit.

While the present invention has been described in conjunction with preferred embodiments thereof, it is evident that many alternatives, modifications and variations will be apparent to those skilled in the art. Accordingly, it is intended to embrace all such alternatives, modifications and variations that fall within the spirit and scope thereof as set forth in the appended claims.

What is claimed is:

1. A LED control circuit, comprising:
   a first control signal input terminal receiving a swing control signal;
   a second control signal input terminal receiving a dimming control signal;
   a pulse edge generator connected to the first control signal input terminal, for generating a clock having a frequency determined by the swing control signal; and
   a duty ratio controller connected to the second control signal input terminal and pulse edge generator, for generating a LED driving signal having a frequency determined by the frequency of the clock and a duty determined by the dimming control signal.

2. The LED control circuit of claim 1, wherein the swing control signal comprises a PWM signal.

3. The LED control circuit of claim 2, wherein the pulse edge generator comprises:
   a low-pass filter connected to the first control signal input terminal, for filtering the PWM signal to generate an analog level signal;
   a voltage controlled oscillator connected to the low-pass filter, for generating an oscillating signal according to the analog level signal; and
   an edge detector connected to the voltage controlled oscillator, for detecting pulse edges of the oscillating signal to generate the clock.

4. The LED control circuit of claim 3, wherein the edge detector comprises:
   a short delay unit connected to the voltage controlled oscillator, for short delaying the oscillating signal to generate a delayed oscillating signal; and
   a digital logic gate connected to the voltage controlled oscillator and short delay unit, for generating the clock according to the oscillating signal and delayed oscillating signal.

5. The LED control circuit of claim 2, wherein the pulse edge generator comprises an edge detector connected to the first control signal input terminal, for detecting pulse edges of the PWM signal to generate the clock.

6. The LED control circuit of claim 5, wherein the edge detector comprises:
   a short delay unit connected to the first control signal input terminal, for short delaying the PWM signal to generate a delayed PWM signal; and
   a digital logic gate connected to the short delay unit, for generating the clock according to the PWM signal and delayed PWM signal.

7. The LED control circuit of claim 1, wherein the swing control signal comprises an analog level signal.

8. The LED control circuit of claim 7, wherein the pulse edge generator comprises:
   a voltage controlled oscillator connected to the first control signal input terminal, for generating an oscillating signal according to the analog level signal; and
   an edge detector connected to the voltage controlled oscillator, for detecting pulse edges of the oscillating signal to generate the clock.

9. The LED control circuit of claim 8, wherein the edge detector comprises:
   a short delay unit connected to the voltage controlled oscillator, for short delaying the oscillating signal to generate a delayed oscillating signal; and
   a digital logic gate connected to the voltage controlled oscillator and short delay unit, for generating the clock according to the oscillating signal and delayed oscillating signal.

10. The LED control circuit of claim 1, wherein the swing control signal comprises a coded signal.

11. The LED control circuit of claim 10, wherein the pulse edge generator comprises:
    a digital-to-analog converter connected to the first control signal input terminal, for converting the coded signal into an analog level signal;
    a voltage controlled oscillator connected to the digital-to-analog converter, for generating an oscillating signal according to the analog level signal; and
    an edge detector connected to the voltage controlled oscillator, for detecting pulse edges of the oscillating signal to generate the clock.

12. The LED control circuit of claim 11, wherein the edge detector comprises:
    a short delay unit connected to the voltage controlled oscillator, for short delaying the oscillating signal to generate a delayed oscillating signal; and
    a digital logic gate connected to the voltage controlled oscillator and short delay unit, for generating the clock according to the oscillating signal and delayed oscillating signal.

13. The LED control circuit of claim 1, wherein the frequency of the LED driving signal varies above 60 Hz.

14. The LED control circuit of claim 1, wherein the dimming control signal comprises a PWM signal.

15. The LED control circuit of claim 14, wherein the duty ratio controller comprises:
    a transistor having an input terminal receiving a first reference voltage, a control terminal receiving the clock from the pulse edge generator, and an output terminal providing a voltage;
    a capacitor connected to the output terminal of the transistor;
    a first low-pass filter connected to the second control signal input terminal, for filtering the PWM signal to generate a first analog level signal;
    a second low-pass filter connected to an output terminal of the duty ratio controller, for filtering the LED driving signal to generate a second analog level signal;
    a voltage controlled current source connected to the output terminal of the transistor, for providing a current according to a difference between the first and second analog level signals to charge or discharge the capacitor during the transistor is off; and
    a PWM generator connected to the output terminal of the transistor, for generating the LED driving signal according to the voltage thereon.

16. The LED control circuit of claim 15, wherein the PWM generator comprises a comparator connected to the output terminal of the transistor, for comparing the voltage on the output terminal of the transistor with a second reference voltage to generate the LED driving signal.

17. The LED control circuit of claim 15, wherein the PWM generator comprises a hysteresis comparator connected to the output terminal of the transistor, for generating the LED driving signal according to the voltage on the output terminal of the transistor.

18. The LED control circuit of claim 15, wherein the PWM generator comprises an inverter string connected to the output terminal of the transistor, for generating the LED driving signal according to the voltage on the output terminal of the transistor.

19. The LED control circuit of claim 14, wherein the duty ratio controller comprises:
 a transistor having an input terminal receiving a first reference voltage, a control terminal receiving the clock from the pulse edge generator, and an output terminal providing a voltage;
 a capacitor connected to the output terminal of the transistor;
 a comparator connected to the second control signal input terminal and an output terminal of the duty ratio controller, for comparing the PWM signal with the LED driving signal to generate a comparison signal;
 a low-pass filter connected to the comparator, for filtering the comparison signal to generate an analog level signal;
 a voltage controlled current source connected to the output terminal of the transistor, for providing a current according to the analog level signal to charge or discharge the capacitor during the transistor is off; and
 a PWM generator connected to the output terminal of the transistor, for generating the LED driving signal according to the voltage thereon.

20. The LED control circuit of claim 19, wherein the PWM generator comprises a second comparator connected to the output terminal of the transistor, for comparing the voltage on the output terminal of the transistor with a second reference voltage to generate the LED driving signal.

21. The LED control circuit of claim 19, wherein the PWM generator comprises a hysteresis comparator connected to the output terminal of the transistor, for generating the LED driving signal according to the voltage on the output terminal of the transistor.

22. The LED control circuit of claim 19, wherein the PWM generator comprises an inverter string connected to the output terminal of the transistor, for generating the LED driving signal according to the voltage on the output terminal of the transistor.

23. The LED control circuit of claim 1, wherein the dimming control signal comprises an analog level signal.

24. The LED control circuit of claim 23, wherein the duty ratio controller comprises:
 a transistor having an input terminal receiving a first reference voltage, a control terminal receiving the clock from the pulse edge generator, and an output terminal providing a voltage;
 a capacitor connected to the output terminal of the transistor;
 a low-pass filter connected to an output terminal of the duty ratio controlled, for filtering the LED driving signal to generate a second analog level signal;
 a voltage controlled current source connected to the output terminal of the transistor, for providing a current according to a difference between the first and second analog level signals to charge or discharge the capacitor during the transistor is off; and
 a PWM generator connected to the output terminal of the transistor, for generating the LED driving signal according to the voltage thereon.

25. The LED control circuit of claim 24, wherein the PWM generator comprises a comparator connected to the output terminal of the transistor, for comparing the voltage on the output terminal of the transistor with a second reference voltage to generate the LED driving signal.

26. The LED control circuit of claim 24, wherein the PWM generator comprises a hysteresis comparator connected to the output terminal of the transistor, for generating the LED driving signal according to the voltage on the output terminal of the transistor.

27. The LED control circuit of claim 24, wherein the PWM generator comprises an inverter string connected to the output terminal of the transistor, for generating the LED driving signal according to the voltage on the output terminal of the transistor.

28. The LED control circuit of claim 1, wherein the dimming control signal comprises a coded signal.

29. The LED control circuit of claim 28, wherein the duty ratio controller comprises:
 a transistor having an input terminal receiving a first reference voltage, a control terminal receiving the clock from the pulse edge generator, and an output terminal providing a voltage;
 a capacitor connected to the output terminal of the transistor;
 a digital-to-analog converter connected to the second control signal input terminal, for converting the coded signal into a first analog level signal;
 a low-pass filter connected to an output terminal of the duty ratio controlled, for filtering the LED driving signal to generate a second analog level signal;
 a voltage controlled current source connected to the output terminal of the transistor, for providing a current according to a difference between the first and second analog level signals to charge or discharge the capacitor during the transistor is off; and
 a PWM generator connected to the output terminal of the transistor, for generating the LED driving signal according to the voltage thereon.

30. The LED control circuit of claim 29, wherein the PWM generator comprises a comparator connected to the output terminal of the transistor, for comparing the voltage on the output terminal of the transistor with a second reference voltage to generate the LED driving signal.

31. The LED control circuit of claim 29, wherein the PWM generator comprises a hysteresis comparator connected to the output terminal of the transistor, for generating the LED driving signal according to the voltage on the output terminal of the transistor.

32. The LED control circuit of claim 29, wherein the PWM generator comprises an inverter string connected to the output terminal of the transistor, for generating the LED driving signal according to the voltage on the output terminal of the transistor.

33. A method for generating a LED driving signal, comprising:
 (a) receiving a swing control signal and a dimming control signal;
 (b) generating a clock having a frequency determined by the swing control signal; and
 (c) responsive to the clock and dimming control signal, generating the LED driving signal having a frequency determined by the frequency of the clock and a duty determined by the dimming control signal.

34. The method of claim 33, wherein the swing control signal controls the frequency of the LED driving signal varies above 60 Hz.

35. The method of claim 33, wherein the swing control signal comprises a PWM signal.

36. The method of claim 35, wherein the step b comprises:
 filtering the PWM signal for generating an analog level signal;
 generating an oscillating signal according to the analog level signal; and
 detecting pulse edges of the oscillating signal for generating the clock.

37. The method of claim 35, wherein the step b comprises detecting pulse edges of the PWM signal for generating the clock.

38. The method of claim 33, wherein the swing control signal comprises an analog level signal.

39. The method of claim 38, wherein the step b comprises:
generating an oscillating signal according to the analog level signal; and
detecting pulse edges of the oscillating signal for generating the clock.

40. The method of claim 33, wherein the swing control signal comprises a coded signal.

41. The method of claim 40, wherein the step b comprises:
converting the coded signal into an analog level signal;
generating an oscillating signal according to the analog level signal; and
detecting pulse edges of the oscillating signal for generating the clock.

42. The method of claim 33, wherein the dimming control signal comprises a PWM signal.

43. The method of claim 42, wherein the step c comprises:
filtering the PWM signal for generating a first analog level signal;
filtering the LED driving signal for generating a second analog level signal; and
determining the duty of the LED driving signal according to a difference between the first and second analog level signals.

44. The method of claim 42, wherein the step c comprises:
comparing the PWM signal with the LED driving signal for generating a comparison signal;
filtering the comparison signal for generating an analog level signal; and
determining the duty of the LED driving signal according to the analog level signal.

45. The method of claim 33, wherein the dimming control signal comprises an analog level signal.

46. The method of claim 45, wherein the step c comprises:
filtering the LED driving signal for generating a second analog level signal; and
determining the duty of the LED driving signal according to a difference between the first and second analog level signals.

47. The method of claim 33, wherein the dimming control signal comprises a coded signal.

48. The method of claim 47, wherein the step c comprises:
converting the coded signal into a first analog level signal;
filtering the LED driving signal to generate a second analog level signal; and
determining the duty of the LED driving signal according to a difference between the first and second analog level signals.

* * * * *